US008156195B2

(12) United States Patent
Hagglund et al.

(10) Patent No.: US 8,156,195 B2
(45) Date of Patent: Apr. 10, 2012

(54) SYSTEMS AND METHODS FOR OBTAINING ULTRA-HIGH DATA AVAILABILITY AND GEOGRAPHIC DISASTER TOLERANCE

(75) Inventors: Dale Hagglund, Edmonton (CA); Ron Unrau, Edmonton (CA); Geoff Hayward, Edmonton (CA); Craig Graulich, Oakton, VA (US); Wayne Karpoff, Sherwood Park (CA)

(73) Assignee: EMC Corporation, Hopkinton, MA (US)

( * ) Notice: Subject to any disclaimer, the term of this patent is extended or adjusted under 35 U.S.C. 154(b) by 1095 days.

(21) Appl. No.: 11/674,996

(22) Filed: Feb. 14, 2007

(65) Prior Publication Data
US 2007/0195692 A1    Aug. 23, 2007

Related U.S. Application Data

(60) Provisional application No. 60/773,401, filed on Feb. 14, 2006.

(51) Int. Cl.
*G06F 15/16* (2006.01)
*G06F 15/167* (2006.01)

(52) U.S. Cl. ......... 709/217; 709/212; 709/213; 709/216

(58) Field of Classification Search ........... 709/212, 709/213, 214, 216; 370/216
See application file for complete search history.

(56) References Cited

U.S. PATENT DOCUMENTS

| | | | |
|---|---|---|---|
| 6,147,968 A * | 11/2000 | De Moer et al. | 370/225 |
| 6,148,414 A | 11/2000 | Brown et al. | |
| 6,857,059 B2 | 2/2005 | Karpoff et al. | |
| 7,266,706 B2 | 9/2007 | Brown et al. | |
| 2002/0166031 A1* | 11/2002 | Chen et al. | 711/141 |
| 2003/0023808 A1* | 1/2003 | Bakke et al. | 711/113 |
| 2003/0208638 A1* | 11/2003 | Abrams et al. | 709/328 |
| 2004/0078638 A1* | 4/2004 | Cochran | 714/6 |
| 2005/0050288 A1* | 3/2005 | Takahashi et al. | 711/162 |
| 2005/0160315 A1* | 7/2005 | Chandrasekaran et al. | 714/15 |
| 2006/0031450 A1 | 2/2006 | Unrau et al. | |
| 2006/0106890 A1* | 5/2006 | Paul et al. | 707/203 |

(Continued)

OTHER PUBLICATIONS

Chen, et al., "CoStore: A reliable and highly available storage system using clusters." In 16th Annual International Symposium on High Performance Computing Systems and Applications, 2002, Proceedings.; p. 3-11. Retrieved from the Internet: <http://gargoyle.arcadia.edu/mathcs/zhengpei/publications/HPCS02_yong.pdf>.

(Continued)

*Primary Examiner* — Kevin Bates
*Assistant Examiner* — Mohammed Ahmed
(74) *Attorney, Agent, or Firm* — BainwoodHuang

(57) ABSTRACT

Network data storage systems and methods allow computers reading and writing data at a plurality of data centers separated by, potentially, large distances to replicate data between sites such that the data is protected from failures, including complete Site failures, while not allowing network latency to significantly impede the performance of read or write operations. Continued access to all data is provided even after a single failure of any component of the system or after any complete failure of all equipment located at any single geographic region or any failure that isolates access to any single geographic region. Write data is replicated synchronously from Active Sites, e.g., sites where servers are writing data to storage resources, to Protection Sites located sufficiently close to Active Sites such that network latency will not significantly impact performance, but sufficiently far apart such that a regional disaster is unlikely to affect both sites. Write data is then asynchronously copied to other sites, potentially including one or more Active sites, located at greater distances.

27 Claims, 31 Drawing Sheets

U.S. PATENT DOCUMENTS

2007/0022264 A1    1/2007  Bromling et al.
2007/0100910 A1*   5/2007  Gole et al. .................... 707/204
2007/0186070 A1*   8/2007  Federa et al. ................ 711/163

OTHER PUBLICATIONS

Citation establish publication date for: Chen, Yong, et al. "CoStore: a reliable and highly available storage system using clusters." In High Performance Computing Systems and Applications, 2002. Proceedings. 16th Annual International Symposium on; p. 3-11. [retrieved on Oct. 11, 2007]. Retrieved from the internet: <url: http://gargoyle.arcadia.edu/mathcs/zhengpei/publications/HPCS02_yong.pdf>.

Chen, Young, et al. "CoStore: A Reliable and Highly Available Storage System Using Clusters," In High Performance Computing Systems and Applications, 2002. Proceedings. 16th Annual International Symposium on; p. 3-11. [retrieved on Oct. 11, 2007]. Retrieved from the internet: <url: http://gargoyle.arcadia.edu/mathcs/zhengpei/publications/HPCS02_yong.pdf>.

* cited by examiner

| FIG. 9A |
|---|
| FIG. 9B |
| FIG. 9C |
| FIG. 9D |
| FIG. 9E |

Table 1 - Write Operation Failure Analysis.

| Step | Failure Case | | Protection Domain A | | | Protection Domain B | | |
|---|---|---|---|---|---|---|---|---|
| | | | Site A<br>New York<br>Active Site<br>Distributed RAID on Local Disk | Site A'<br>New Jersey<br>Protection Site<br>No Local Disk | | Site B'<br>Manchester<br>Protection Site<br>No Local Disk | Site B<br>London<br>Active Site<br>Distributed RAID on Local Disk | |
| 1 | | | Host H₁ issues write W0 at Site A | | | | | |
| | F1A | Site A Fails | Failure<br>- Complete site failure<br>- Network partition with Site A declared as a loser<br>- Partial network failure causing A to be fenced | | | | | |
| | | | A is fenced | | | | | |
| | | | Uncommitted (unacknowledged) write W0 is lost. | Failure recovery - insert protected pages into appropriate open and exchanging delta sets | | | | |
| | | | | Normal operation continues - although A' is effectively idle | | Normal operation continues | | |
| | F1A' | Site A' Fails | | Failure<br>- Complete site failure<br>- Network partition with Site A' declared as a loser<br>- Partial network failure causing A' to be fenced | | | | |
| | | | | A' is fenced | | Rediscovery | | |
| | | | Rediscovery | | | | Delta rollover causes dirty data to be aggressively flushed | |
| | | | Operaterational choice:<br>1) Go into write-through<br>2) Continue to operate in degraded safety mode<br>3) Gracefully shutdown Site A | | | | | |
| | | | Normal operation continues | | | Normal operation continues | | |
| | F1B | Site B Fails | | | | | Failure<br>- Complete site failure<br>- Network partition with Site B declared as a loser<br>- Partial network failure causing B to be fenced | |
| | | | | | | | B is fenced | |
| | | | Rediscovery | | Rediscovery | | Failure recovery - insert protected pages into appropriate open and exchanging delta sets | |
| | | | Normal operation continues - Writes are logged in bit-map-log to allow recovery | | Normal operation continues | Normal operation continues - although B' is effectively idle | | |

Table 1 - Write Operation Failure Analysis.

| Step | Failure Case | Protection Domain A | | Protection Domain B | |
|---|---|---|---|---|---|
| | | Site A<br>New York<br>Active Site<br>Distributed RAID on Local Disk | Site A'<br>New Jersey<br>Protection Site<br>No Local Disk | Site B'<br>Manchester<br>Protection Site<br>No Local Disk | Site B<br>London<br>Active Site<br>Distributed RAID on Local Disk |
| 1. | F1B' Site B' Fails | | | Failure<br>- Complete site failure<br>- Network partition with Site B' declared as a loser<br>- Partial network failure causing B' to be fenced | |
| | | Rediscovery | Rediscovery | B' is fenced | Rediscovery |
| | | Delta rollover causes dirty data to be aggressively flushed | | | Delta rollover causes dirty data to be aggressively flushed |
| | | | | | Operaterational choice:<br>1) Go into write-through<br>2) Continue to operate in degraded safety mode<br>3) Gracefully shutdown Site B |
| | | Normal operation continues | Normal operation continues | | Normal operation continues |
| 2. | F2A - Site A Fails -<br>F2B' Site B' Fails | Site A simultaneously and synchronously invalidates:<br>• protection copy at A'<br>• performance copy at B, if necessary | | | Site B invalidates protection copy at B', if necessary |
| 3. | F3A Site A Fails | Failure<br>- Complete site failure<br>- Network partition with Site A declared as a loser<br>- Partial network failure causing A to be fenced | Same steps and results as in F1A' - F1B' | | |
| | | A is fenced | Rediscovery | Rediscovery | Rediscovery |
| | | Uncommitted (unacknowledged) write W0 is lost. Old version of the block still in the open delta set has also been lost. | Failure recovery - insert protected pages into appropriate open and exchanging delta sets | | |
| | | | A' acknowledges invalidation complete to A | B' acknowledges invalidation complete to B | B acknowledges invalidation complete to A |
| | | | Normal operation continues - although A is effectively idle | Normal operation continues | Normal operation continues - Writes are logged in bit-map-log to allow recovery |
| | F3A' Site A' Fails -<br>F3B' Site B' Fails | | Same steps and results as in F1A' - F1B' | | |
| 4. | | A sends W0 to Site A' | | | |

Table 1 - Write Operation Failure Analysis.

| Step | Failure Case | | Protection Domain A | | | Protection Domain B | |
|---|---|---|---|---|---|---|---|
| | | | Site A<br>New York<br>Active Site<br>Distributed RAID on Local Disk | Site A'<br>New Jersey<br>Protection Site<br>No Local Disk | | Site B'<br>Manchester<br>Protection Site<br>No Local Disk | Site B<br>London<br>Active Site<br>Distributed RAID on Local Disk |
| 5. | F4A -<br>F4B' | Site A Fails -<br>Site B' Fails | Assuming block send to A' failed as part of the failure, same steps and results as in F3A - F3B'. If block send did not fail, see F5A-F5B' | | | | |
| | F5A | Site A Fails | Failure<br>- Complete site failure<br>- Network partition with Site A declared as a loser<br>- Partial network failure causing A to be fenced<br>A is fenced | A' acknowledges receipt of block W0 to A | | | |
| | | | Uncommitted (unacknowledged) write is NOT lost. It is immediately available to other sites via A' and is aggressively flushed (in write dependant order) to the mirror at site B. | Rediscovery | | Rediscovery | Rediscovery |
| | | | | Failure recovery - insert protected pages into appropriate open and exchanging delta sets<br>- Write W0 is immediately available via cache coherence mechanism<br>- Current WOF exchange is restarted<br>- Open WOF delta is closed, exchanged | | | |
| | F5A' -<br>F5B' | Site A' Fails -<br>Site B' Fails | | Normal operation continues - although A' is effectively idle | Normal operation continues | | Normal operation continues -<br>Writes are logged in bit-map-log to allow recovery |
| 6. | F6A -<br>F6B' | Site A' Fails -<br>Site B' Fails | A acknowledges that block W0 is safely written to host H₁ | | | | |
| | | | Same steps and results as F5A - F5B'. Only difference is that host H1 received acknowledgement for write W0. | | | | |
| 7. | F7A | Site A Fails | When Delta Set closes, A asynchronously exchanges the Delta Set (D1) that includes block W0 to B (pipeline advance) | | | | When Delta Set closes, B asynchronously exchanges the Delta Set (D1) to A (pipeline advance) |
| | | | Failure<br>- Complete site failure<br>- Network partition with Site A declared as a loser<br>- Partial network failure causing A to be fenced<br>A is fenced | Rediscovery | | Rediscovery | Rediscovery |
| | | | | Failure recovery - insert protected pages into appropriate open and exchanging delta sets | | | |

Table 1 - Write Operation Failure Analysis.

| Step | Failure Case | Protection Domain A | | Protection Domain B | |
|---|---|---|---|---|---|
| | | Site A<br>New York<br>Active Site<br>Distributed RAID on Local Disk | Site A'<br>New Jersey<br>Protection Site<br>No Local Disk | Site B'<br>Manchester<br>Protection Site<br>No Local Disk | Site B<br>London<br>Active Site<br>Distributed RAID on Local Disk |
| | F7A' Site A' Fails | | Exchange of delta set D1 is restarted with A' as the source rather than A. Currently open delta set is closed/exchanged as soon as the exchange is complete | | |
| | | Normal operation continues - although A' is effectively idle | Normal operation continues | Normal operation continues - Writes are logged in bit-map-log to allow recovery | |
| | F7B Site B Fails | Same steps and results as F1A' | | | |
| | | | | | Failure<br>- Complete site failure<br>- Network partition with Site B declared as a loser<br>- Partial network failure causing B to be fenced |
| | | Rediscovery | Rediscovery | Rediscovery | B is fenced |
| | | | | Dirty contents of delta set D1 from B are immediately available via cache coherence<br>Exchange of delta set D1 is restarted with B' as the source rather than B. Currently open delta set is closed/exchanged as soon as the exchange is complete | |
| | | Normal operation continues - Writes are logged in bit-map-log to allow recovery | Normal operation continues | Normal operation continues - although B' is effectively idle | |
| | F7B' Site B' Fails | Same steps and results as F1B' | | | |
| 8. | F8A - Site A Fails -<br>F8B' Site B' Fails | A & B write delta set D1 to WOF journal | | | A & B write delta set D1 to WOF journal |
| 9. | F9A Site A Fails | A & B confirm they have a complete copy of the Delta Set in cache (pipeline advance) | | | A & B confirm they have a complete copy of the Delta Set in cache (pipeline advance) |
| | | Failure<br>- Complete site failure<br>- Network partition with Site B declared as a loser<br>- Partial network failure causing B to be fenced | | | |
| | | A is fenced | Rediscovery | Rediscovery | Rediscovery |

Table 1 - Write Operation Failure Analysis.

| Step | Failure Case | Protection Domain A | | Protection Domain B | |
|---|---|---|---|---|---|
| | | Site A<br>New York<br>Active Site<br>Distributed RAID on Local Disk | Site A'<br>New Jersey<br>Protection Site<br>No Local Disk | Site B'<br>Manchester<br>Protection Site<br>No Local Disk | Site B<br>London<br>Active Site<br>Distributed RAID on Local Disk |
| | | | (Exchange of delta set D2 is initiated) | | Operations continue normally<br>- Commit to disk of delta set D1 is initiated (with bitmap logging)<br>- Exchange of delta set D2 is initiated with A' |
| F9A', F9B' | Site A' Fails, Site B' Fails | | Normal operations resume | Normal operations resumes | Normal operation continues - Writes are logged in bitmap-log to allow recovery |
| | | Same steps and results as F1A', F1B' | | | |
| F9B | Site B Fails | | | | Failure<br>- Complete site failure<br>- Network partition with Site B declared as a loser<br>- Partial network failure causing B to be fenced |
| | | Rediscovery | Rediscovery | Rediscovery | B is fenced |
| | | Operations continue normally<br>- Commit to disk of delta set D1 is initiated (with bitmap logging)<br>- Exchange of delta set D2 is initiated with B' | | (Exchange of delta set D2 is initiated) | |
| | | Normal operation continues - Writes are logged in bitmap-log to allow recovery | Normal operations resume | Normal operations resumes | |
| 10. | | A writes Delta Set D1, including block W0 to local disk | | | B writes Delta Set D1 including block W0 to local disk |
| F10A, F10B | Site A Fails - Site B' Fails | Same steps and results as F9A - F9B' | | | |

| FIG. 10A |
|---|
| FIG. 10B |
| FIG. 10C |

FIG. 10

Table 2a - Read Scenario 1: R0 data is in Control Node cache

| Step | Failure Case | | Protection Domain A | | Protection Domain B | |
|---|---|---|---|---|---|---|
| | | | Site A<br>New York<br>Active Site<br>Distributed RAID on Local Disk | Site A'<br>New Jersey<br>Protection Site<br>No Local Disk | Site B'<br>Manchester<br>Protection Site<br>No Local Disk | Site B<br>London<br>Active Site<br>Distributed RAID on Local Disk |
| 1. | | | Host H1 issues R0, a read to Site A, Control Node A1 | | | |
| | F1A Site A Fails | | Failure<br>- Complete site failure<br>- Network partition with Site A declared as a loser<br>- Partial network failure causing A to be fenced | | | |
| | | | A is fenced | | | |
| | | | Uncommitted (unacknowledged) read R0 is unsatisfied. | | | |
| | | | | Rediscovery | Rediscovery | Rediscovery |
| | | | Operations continue normally | Operations continue normally | Operations continue normally | Operations continue normally |
| | F1A' Site A' Fails | | | Failure<br>- Complete site failure<br>- Network partition with Site A' declared as a loser<br>- Partial network failure causing A' to be fenced | | |
| | | | | A' is fenced | | |
| | | | Rediscovery | Rediscovery | Rediscovery | Rediscovery |
| | | | Operations continue normally | Operations continue normally | Operations continue normally | Operations continue normally |

| | | | | | | |
|---|---|---|---|---|---|---|
| F1B Site B Fails | Rediscovery | Rediscovery | Rediscovery | Rediscovery | Rediscovery | Failure<br>- Complete site failure<br>- Network partition with Site B declared as a loser<br>- Partial network failure causing B to be fenced |
| | Operations continue normally | Operations continue normally | Operations continue normally | Operations continue normally | | B is fenced |
| F1B' Site B' Fails | | | Rediscovery | Failure<br>- Complete site failure<br>- Network partition with Site B' declared as a loser<br>- Partial network failure causing B' to be fenced | Rediscovery | |
| | | | Operations continue normally | B' is fenced | Operations continue normally | |
| 2. | Control Node A1 Finds R0 data in it's cache | | | | | |
| F2A - Site A Fails -<br>F2B' Site B' Fails | Failure<br>- Complete site failure<br>- Network partition with Site A declared as a loser<br>- Partial network failure causing A to be fenced | | Rediscovery | Rediscovery | Rediscovery | Rediscovery |
| | A is fenced | | | | | |

FIG. 10C

| F2A | In case of network failure, read completes and further I/O is suspended. In case of hard failure, read is unsatisfied | Operations continue normally | Operations continue normally | Operations continue normally |
|---|---|---|---|---|
| F2A' · Site A' Fails - F2B' Site B' Fails | | Same steps and results as in F1A' - F1B' | | |
| 3. | Block R0 is returned to host H1 | | | |

| FIG. 11A |
|----------|
| FIG. 11B |
| FIG. 11C |

FIG. 11

Table 2b - Read Scenario 2: R0 data is in Control Node A2 cache where A2 is a second Control Node at Site A

| | | Protection Domain A | | Protection Domain B | |
|---|---|---|---|---|---|
| | Site A<br>New York<br>Active Site<br>Distributed RAID on Local Disk | Site A'<br>New Jersey<br>Protection Site<br>No Local Disk | Site B'<br>Manchester<br>Protection Site<br>No Local Disk | Site B<br>London<br>Active Site<br>Distributed RAID on Local Disk |
| Step | Failure Case | | | | |
| 1. | | Host H1 issues R0, a read to Site A, Control Node A1 | | | |
| | F1A Site A Fails | Failure<br>- Complete site failure<br>- Network partition with Site A declared as a loser<br>- Partial network failure causing A to be fenced | | | |
| | | A is fenced | Rediscovery | Rediscovery | Rediscovery |
| | | Uncommitted (unacknowledged) read R0 is unsatisfied. | Operations continue normally | Operations continue normally | Operations continue normally |
| | F1A' Site A' Fails | | Failure<br>- Complete site failure<br>- Network partition with Site A' declared as a loser<br>- Partial network failure causing A' to be fenced | | |
| | | Rediscovery | A' is fenced | Rediscovery | Rediscovery |
| | | Operations continue normally | | Operations continue normally | Operations continue normally |

| | | In case of network failure, read completes and further I/O is suspended. In case of hard failure, read is unsatisfied | Operations continue normally | Operations continue normally | Operations continue normally |
|---|---|---|---|---|---|
| 3. | F2A'· Site A' Fails - F2B' Site B' Fails | Block R0 is inserted into Control Node A1's cache | Same steps and results as in F1A' - F1B' | | |
| | F3A'· Site A Fails - F3B' Site B' Fails | | Same steps and results as in F1A - F1B' | | |
| 4. | | Block R0 is returned to host H1 | | | |

| FIG. 12A |
|---|
| FIG. 12B |
| FIG. 12C |
| FIG. 12D |

Table 2c - Read Scenario 3: R0 data is in Control Node B1 cache where B is a second Control Node at Site B

| Step | Failure Case | | Protection Domain A | | Protection Domain B | |
|---|---|---|---|---|---|---|
| | | | Site A<br>New York<br>Active Site<br>Distributed RAID on<br>Local Disk | Site A'<br>New Jersey<br>Protection Site<br>No Local Disk | Site B'<br>Manchester<br>Protection Site<br>No Local Disk | Site B<br>London<br>Active Site<br>Distributed RAID on<br>Local Disk |
| 1. | | | Host H1 issues R0, a read to Site A, Control Node A1 | | | |
| | F1A | Site A Fails | Failure<br>- Complete site failure<br>- Network partition with Site A declared as a loser<br>- Partial network failure causing A to be fenced | | | |
| | | | A is fenced | | | |
| | | | Uncommitted (unacknowledged) read $R_0$ is unsatisfied. | | | |
| | | | | Rediscovery | Rediscovery | Rediscovery |
| | | | Operations continue normally | Operations continue normally | Operations continue normally | Operations continue normally |
| | F1A' | Site A' Fails | | Failure<br>- Complete site failure<br>- Network partition with Site A' declared as a loser<br>- Partial network failure causing A' to be fenced | | |
| | | | | A' is fenced | | |
| | | | Rediscovery | | Rediscovery | Rediscovery |
| | | | Operations continue normally | | Operations continue normally | Operations continue normally |

FIG. 12B

| | | Rediscovery | Rediscovery | Rediscovery | Rediscovery | Failure<br>- Complete site failure<br>- Network partition with Site B declared as a loser<br>- Partial network failure causing B to be fenced |
|---|---|---|---|---|---|---|
| F1B | Site B Fails | Operations continue normally | Operations continue normally | Operations continue normally | Rediscovery | B is fenced |
| | | | | | Failure<br>- Complete site failure<br>- Network partition with Site B' declared as a loser<br>- Partial network failure causing B' to be fenced | |
| | | Rediscovery | Rediscovery | Rediscovery | Rediscovery | Rediscovery |
| F1B' | Site B' Fails | Operations continue normally | Operations continue normally | Operations continue normally | B' is fenced | Operations continue normally |
| 2. | | Control Node A1 issues a share request to Control Node B1 for R0 data | | | | |
| F2A | Site A Fails | Same steps and results as in F1A | | | | |
| F2A' | Site A' Fails | Same steps and results as in F1A' | | | | |

FIG. 12C

| | | Rediscovery | Rediscovery | Rediscovery | Failure<br>- Complete site failure<br>- Network partition with Site B declared as a loser<br>- Partial network failure causing B to be fenced |
|---|---|---|---|---|---|
| F2B | Site B Fails | 2 distinct cases:<br>- R0 data was dirty in YYB1's cache. A1 will re-issue the share request to get the data from the protection copy at B'.<br>- R0 data was clean in YYB1's cache. A1 will satisfy the request from disk. | (Failure recovery) | | B is fenced |
| | | Operations continue normally | Operations continue normally | Operations continue normally, but B' is effectively idle | |
| F2B' | Site B' Fails | Same steps and results as F1B' | | | |
| F3A | Site A Fails | Block R0 is inserted into Control Node A1's cache | | | |
| | | Rediscovery | Rediscovery | Rediscovery | Failure<br>- Complete site failure<br>- Network partition with Site B declared as a loser<br>- Partial network failure causing B to be fenced |
| | | | | | A is fenced |

| | In case of network failure, read completes and further I/O is suspended. In case of hard failure, read is unsatisfied | Operations continue normally | Operations continue normally | Operations continue normally |
|---|---|---|---|---|
| F3A' - Site A Fails - F3B' Site B' Fails | | Same steps and results as in F1A - F1B' | | |
| 4. | Block R0 is returned to host H1 | | | |

| FIG. 13A |
|---|
| FIG. 13B |
| FIG. 13C |

FIG. 13

Table 2d - Read Scenario 4: R0 data is not cached anyware

| | | Protection Domain A | | Protection Domain B | |
|---|---|---|---|---|---|
| | | Site A<br>New York<br>Active Site<br>Distributed RAID on Local Disk | Site A'<br>New Jersey<br>Protection Site<br>No Local Disk | Site B'<br>Manchester<br>Protection Site<br>No Local Disk | Site B<br>London<br>Active Site<br>Distributed RAID on Local Disk |
| Step | Failure Case | | | | |
| 1. | | Host H1 issues R0, a read to Site A, Control Node A1 | | | |
| | F1A Site A Fails | Failure<br>- Complete site failure<br>- Network partition with Site A declared as a loser<br>- Partial network failure causing A to be fenced | | | |
| | | A is fenced | Rediscovery | Rediscovery | Rediscovery |
| | | Uncommitted (unacknowledged) read R0 is unsatisfied. | Operations continue normally | Operations continue normally | Operations continue normally |
| | F1A' Site A' Fails | | Failure<br>- Complete site failure<br>- Network partition with Site A' declared as a loser<br>- Partial network failure causing A' to be fenced | | |
| | | Rediscovery | A' is fenced | Rediscovery | Rediscovery |
| | | Operations continue normally | | Operations continue normally | Operations continue normally |

| | | Rediscovery | Rediscovery | Rediscovery | Rediscovery | Failure<br>- Complete site failure<br>- Network partition with Site B declared as a loser<br>- Partial network failure causing B to be fenced<br>B is fenced |
|---|---|---|---|---|---|---|
| F1B | Site B Fails | Operations continue normally | Operations continue normally | Operations continue normally | Operations continue normally | |
| F1B' | Site B' Fails | | | Failure<br>- Complete site failure<br>- Network partition with Site B' declared as a loser<br>- Partial network failure causing B' to be fenced<br>B' is fenced | | |
| | | Rediscovery | Rediscovery | Rediscovery | Rediscovery | Rediscovery |
| | | Operations continue normally | Operations continue normally | | | Operations continue normally |
| 2. | | Control Node A1 issues a read request to disk for R0 data | | | | |
| F2A | Site A Fails | Failure<br>- Complete site failure<br>- Network partition with Site B declared as a loser<br>- Partial network failure causing B to be fenced<br>A is fenced | | | | |
| | | Rediscovery | Rediscovery | Rediscovery | Rediscovery | Rediscovery |

FIG. 13C

| | | | In case of network failure, read completes and further I/O is suspended. In case of hard failure, read is unsatisfied | Operations continue normally | Operations continue normally | Operations continue normally |
|---|---|---|---|---|---|---|
| | F2A' - F2B' | Site A' Fails - Site B' Fails | Same steps and results as in F1A' - F1B' | | | |
| 3. | F2A - F2B' | Site A Fails - Site B Fails | Block R0 is inserted into Control Node A1's cache | Same steps and results as F2A - F2B' | | |
| 4. | | | Block R0 is returned to host H1 | | | |

# SYSTEMS AND METHODS FOR OBTAINING ULTRA-HIGH DATA AVAILABILITY AND GEOGRAPHIC DISASTER TOLERANCE

CROSS-REFERENCES TO RELATED APPLICATIONS

The present application is a Non-provisional application and claims priority to U.S. Provisional Application Ser. No. 60/773,401, filed on Feb. 14, 2006, the entire contents of which are herein incorporated by reference for all purposes.

COPYRIGHT NOTICE

A portion of the disclosure of this patent document contains material which is subject to copyright protection. The copyright owner has no objection to the facsimile reproduction by anyone of the patent document or the patent disclosure, as it appears in the U.S. Patent and Trademark Office patent file or records, but otherwise reserves all copyright rights whatsoever.

BACKGROUND

The present invention relates generally to network storage systems and methods, and more particularly to network storage systems that provide ultra-high data availability and geographic disaster tolerance.

In current storage networks, and in particular storage networks including geographically separated access nodes and storage resources interconnected by a network, it is desirable to provide systems and methods with what is often referred to as a "Zero Recovery Point Object (RPO)", meaning no data loss, and "Zero Recovery Time Objective (RTO)", meaning no loss in data availability, with minimal equipment investment.

Unfortunately current technologies are typically limited to data replication over purely synchronous distances or to replication within a single site accepting writes and only standby access to the data at sites separated by longer distances. Both of these solutions fail at achieving both Zero RPO and Zero RTO. Examples of current commercial systems providing data replication over distance include Symmetrix Remote Data Facility (SRDF) from EMC Corporation and True Copy from Hitachi Corporation.

It is also desirable that data access be localized, in part to improve access speed to blocks of data requested by host devices. Caching blocks at access nodes provides localization, however, the cached data must be kept coherent with respect to modifications at other access nodes that may be caching the same data.

Further, such complex storage applications need to withstand the failure of their backing storage systems, of local storage networks, of the network interconnecting nodes, and of the access nodes. Should a failure occur, asynchronous data transmission implies the potential for the loss of data held at the failed site. Moreover, a consistent data image, from the perspective of the application, needs to be constructed from the surviving storage contents. An application must make some assumptions about which writes, or pieces of data to be written, to the storage system have survived the storage system failure; specifically, that for all writes acknowledged by the storage system as having been completed, that the ordering of writes is maintained such that if a modification due to a write to a given block is lost, then all subsequent writes to blocks in the volume or related volumes of blocks is also lost.

Accordingly it is desirable to provide systems and methods that provide high data availability and geographic fault tolerance.

BRIEF SUMMARY

The present invention provides systems and methods that offer high data availability and geographic fault tolerance. In particular, network data storage systems and methods are provided that allow computers reading and writing data at a plurality of data centers separated by, potentially, large distances to replicate data between sites such that the data is protected from failures, including complete Site failures, while not allowing network latency to significantly impede the performance of read or write operations. Optionally, the systems and methods provide a coherence model such that more than one such sites can read or write the same volume of data concurrently. Additionally, and optionally, the systems and methods provide mechanisms that provide a time consistent data image allowing an operational restart after the failure of two sites.

Various embodiments enable an enterprise to maintain a Zero Recovery Point Objective (RPO) and a zero Recovery Time Objective (RTO), even after a catastrophic disaster. In one embodiment, systems and methods are provided that allow continued access to all data even after a single failure of any component of the system or after any complete failure of all equipment located at any single geographic region or any failure that isolates access to any single geographic region. This is accomplished, in certain aspects, by replicating write data synchronously from Active Sites, e.g., sites where servers are writing data to storage resources, to Protection Sites located sufficiently close to Active Sites such that network latency will not significantly impact performance, but sufficiently far apart such that a regional disaster is unlikely to affect both sites. Write data is then asynchronously copied to other sites, potentially including one or more Active sites, located at greater distances. In certain aspects, Write Order Fidelity ("WOF"), as taught in U.S. application Ser. No. 11/486,754, filed Jul. 14, 2006, titled "Maintaining Write Order Fidelity on a Multi-Writer System," the entire contents of which are herein incorporated by reference for all purposes, is used to ensure that a time consistent image of the data is available for restarting operations after losing both the Active and Protection sites.

In certain aspects, all Control Nodes are coherent, as taught by U.S. application Ser. No. 11/177,924, filed Jul. 07, 2005, the entire contents of which are herein incorporated by reference for all purposes, such that all Control Nodes behave as if accessing a single disk drive with synchronous coherence while physical data motion may be asynchronous. This allows clustered applications to operate on opposite ends of long asynchronous distances accessing a single common data image with general performance equivalent to local performance. Even for single-instance applications, e.g., an application which does not support clustering of its execution across a plurality of computer systems, this is particularly useful as it allows load-balancing across all asynchronous sites and rapid failover of applications in the event of a site or system failure.

In one embodiment, two Active sites are provided, where each active site has a corresponding Protection Site and where writes to the Active site are synchronously mirrored to the Protection site. Other embodiments include more than one Protection site per Active site along with additional network redundancy which allows tolerance of failures at more than a single geographic region. Other embodiments provide for greater than two Active sites. Other embodiments allow the Protection Sites to also have active I/O using other sites within synchronous distances to protect dirty pages, as defined below, while serving I/O to their respective host systems ("Hosts").

Aspects of the present invention advantageously support both transaction-intensive workloads, i.e., workloads consisting of a high volume of short, latency-sensitive transactions, as well as throughput-orientated workloads, i.e., workloads with large regions read from or written to in each transaction. Aspects of the present invention also advantageously allow clustered applications and operations normally restricted to a single site to be operated between widely separated sites. Further, aspects of the present invention not only increase operational resiliency, but also optimize network usage.

According to one aspect of the present invention, a method is provided for providing data availability and fault tolerance in a data storage network having a first protection domain comprising a first site and a second site located remotely from the first site, and a second protection domain located remotely from the first protection domain, the second protection domain having multiple sites, each site including at least one control node. The method typically includes the steps of storing a write request received from a host system to a first cache, the first cache corresponding to a first node in the first site, and transmitting the write request to a second node at the second site geographically remote from the first site. The method also typically includes storing the write request received from the first node to a second cache in the second node, and receiving at the first node an acknowledgement from the second node that the write request was received by the second node. The method further typically includes, thereafter, acknowledging to the host system that the write request is complete, and thereafter sending the write request to a third node at a third site within a second protection domain that is geographically remote from the first protection domain.

According to another aspect of the present invention, a data storage network control node is provided that typically includes a cache and a processor module that implements logic that is typically configured to store a data access request received from a host system to the cache, the host system and data storage network control node being in a first site, and to send the data access request to a second control node in a second site geographically remote from the first site, said first and second sites being part of a first protection domain. The logic is also typically configured to, upon receiving an acknowledgement from the second control node that the data access request is stored in its cache: a) acknowledge to the host system hat the data access request is complete, and thereafter b) send the data access request to a third control node in a second protection domain that is geographically remote from the first protection domain.

According to yet another aspect of the present invention, a data storage network that provides high data availability and fault tolerance is provided. The network typically includes a first protection domain including a first site having a first control node and a second site having a second control node, wherein the first and second control nodes each have a cache, and wherein the first site is geographically remote from the second site. The network also typically includes a second protection domain having multiple sites, each site having a control node, each control node having a cache, wherein the second protection domain is geographically remote from the first protection domain. The first control node is typically configured to store a data access request received from a host within the first site to its cache, and to send the data access request to the second node. The first control node is also typically configured to, upon receiving an acknowledgement from the second node that the data access request is stored in cache, a) acknowledge to the host that the data access request is complete, and thereafter b) send the data access request to a third control node in the second protection domain.

Reference to the remaining portions of the specification, including the drawings and claims, will realize other features and advantages of the present invention. Further features and advantages of the present invention, as well as the structure and operation of various embodiments of the present invention, are described in detail below with respect to the accompanying drawings. In the drawings, like reference numbers indicate identical or functionally similar elements.

BRIEF DESCRIPTION OF THE DRAWINGS

Various embodiments in accordance with the present invention will be described with reference to the drawings, in which:

Figures 9, 9A, 9B, 9C, 9D, 9E:
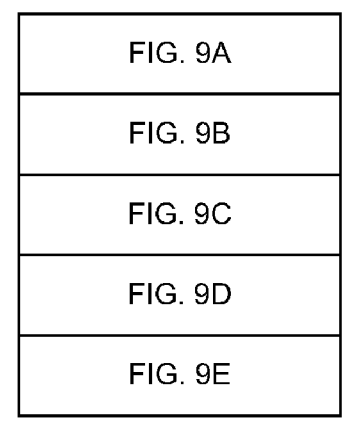
Figures 10, 10A, 10B, 10C:
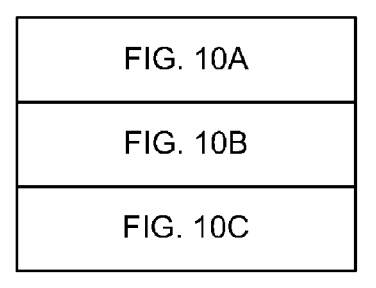
Figures 11, 11A, 11B, 11C:
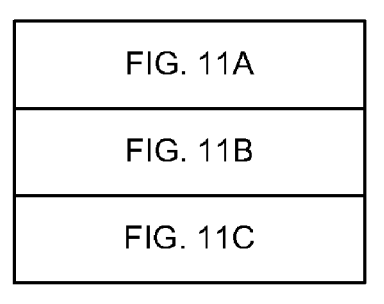
Figure 11B:
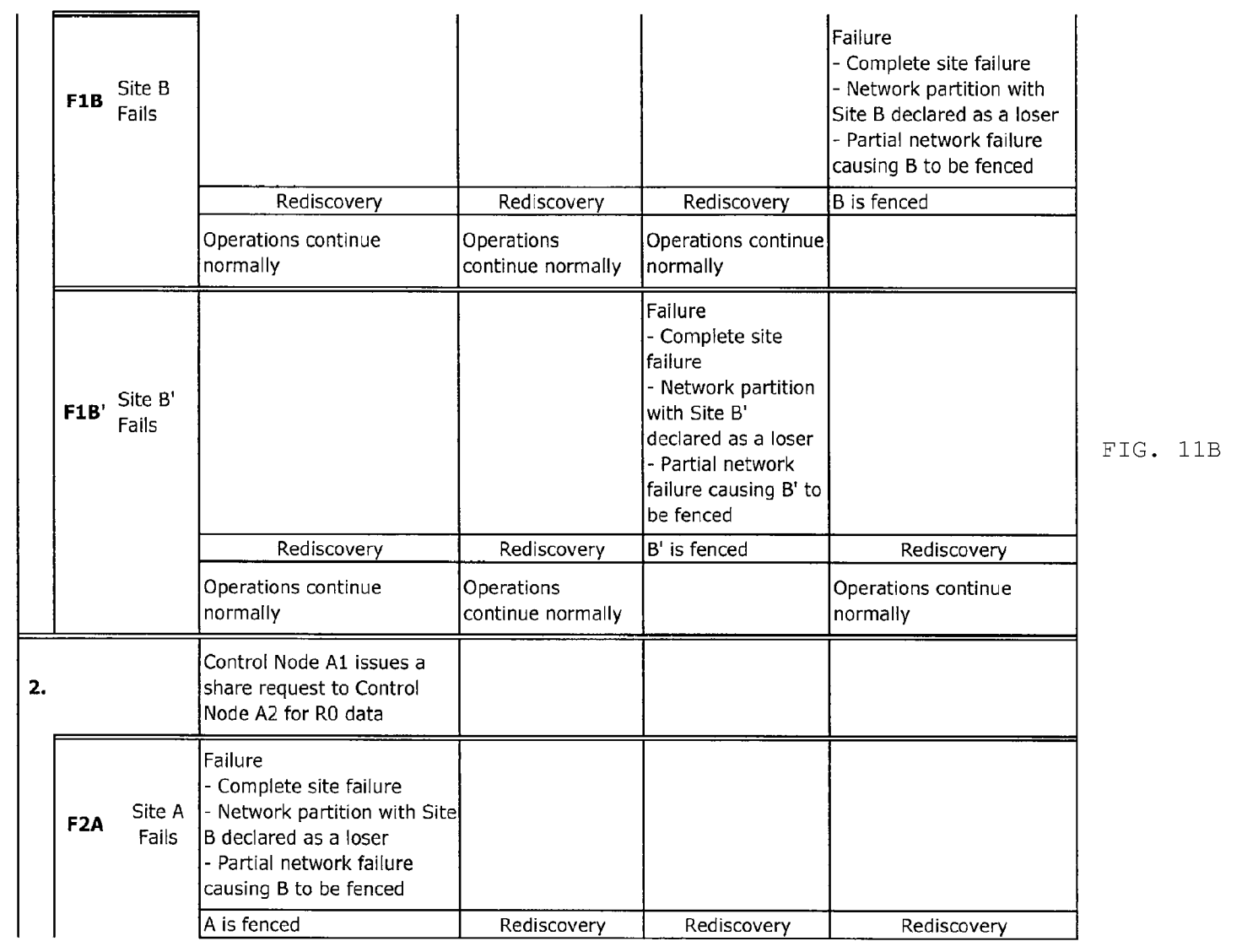
Figures 12, 12A, 12B, 12C, 12D:
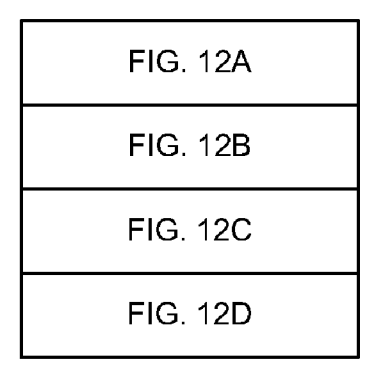
Figures 13, 13A, 13B, 13C:
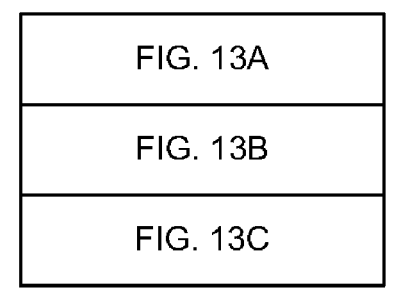

FIGS. 9-13 include Tables 1-2d that illustrate the detailed steps in read and write operations with various failures inserted throughout the steps. There is one scenario for a Write (Table 1) and four scenarios for a Read (Table 2).

DETAILED DESCRIPTION

Definitions

As used herein:

"Site" refers to the equipment, including some or all of Hosts, Control Nodes, storage area network (SAN) fabrics, other network fabrics, Storage Systems and resources, maintained collectively at one geographic location or area.

"Active Site" refers to any Site accepting write operations from Hosts within that site.

"Dirty Data", refers to data received into volatile cache from a host write and acknowledged as safe to the host, but not yet written to a backend Storage System.

"Host", refers to a computer system that reads and writes data via one or more Control Nodes.

"Mirror", refers to a RAID 1 copy (refer below to the definition RAID) of a physical region of storage. A Mirror may reside within a site or across sites, which is referred to as a Distributed Mirror.

"Protection Domain" refers to a collection of sites that protect Dirty Data by synchronously sharing Dirty Data between sites at a cache layer. This operation is described in more detail below.

"Storage System" refers to a device that accepts write operations from a Host. Storage Systems may be simple disks or RAID enabled systems that accept read and write operations and distribute the physical data across multiple disks in a redundant fashion. RAID systems and definitions are well know to those skilled in the art. A good explanation of RAID can be found in The RAID Advisory Board's (RAB) Handbook on System Storage Technology, 6th edition, the contents of which are herein incorporated by reference for all purposes. One skilled in the art will realize that other devices that store data on media other than disk can also be used.

"Write Order Fidelity (WOF)" refers to a mechanism where data from confirmed write operations is delivered asynchronous between locations such that if a site fails with yet undistributed Dirty Data, the surviving sites can be restarted with an earlier time-consistent data image. A data image is time consistent if a write from time t is reflected in the data image, then all earlier writes are also reflected in the image, regardless of from which Host or Control Node the write originated. WOF is taught in more detail in application Ser. No. 11/486,754 which is incorporated in its entirety.

Physical Configurations

Figure 1:
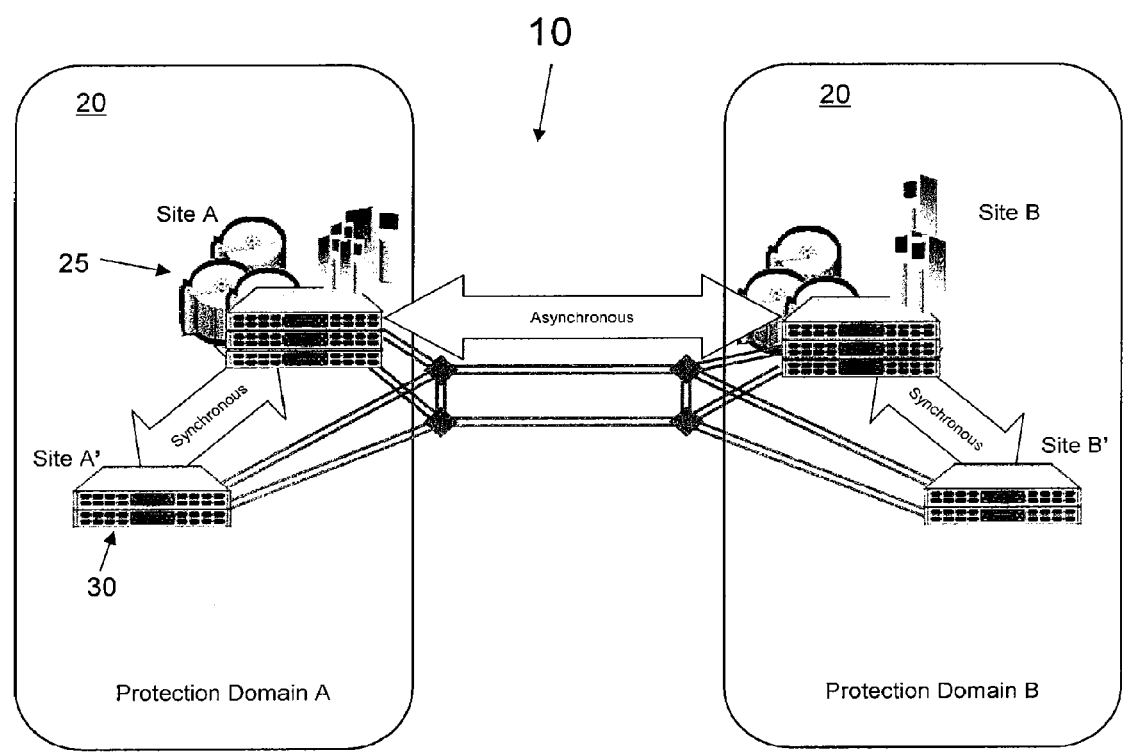
FIG. 1 illustrates a two Protection Domain system configuration according to one embodiment, with each Protection Domain having a single Active Site and a single Protection Site.
Figure 2:
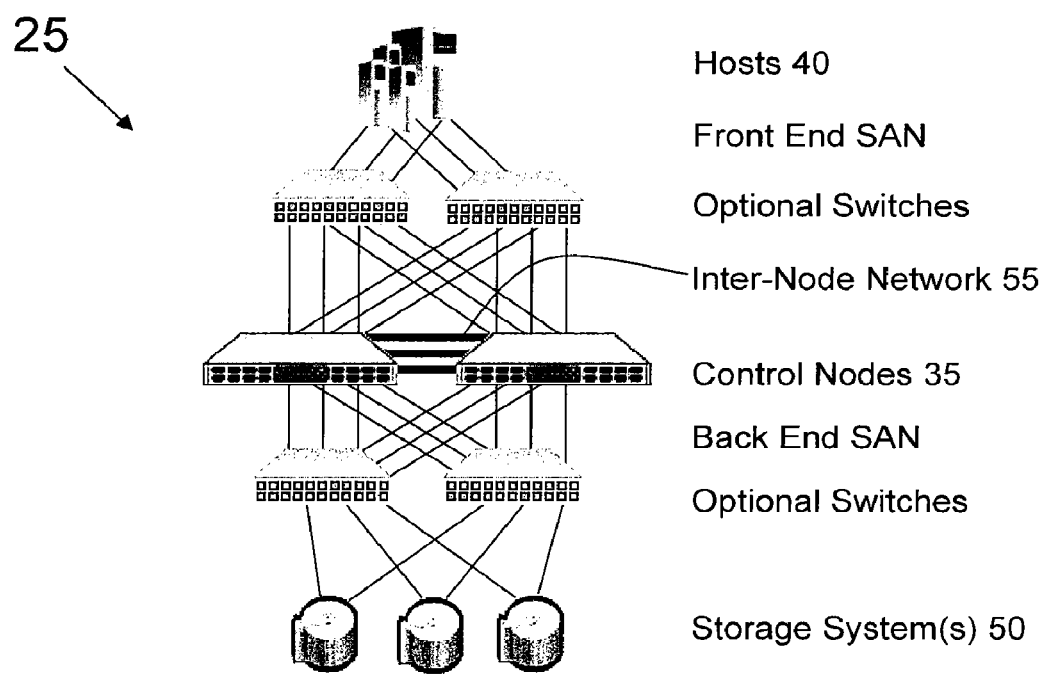
FIG. 2 illustrates a one example of how a site might be configured. One skilled in configuring storage systems and storage area networks (SANS) will know of many other applicable variations of this topology.

FIG. 1 illustrates a two Protection Domain system configuration with each Protection Domain 20 having a single Active Site 25 and a single Protection Site 30 according to one embodiment. As shown in FIG. 2, each Active Site 25 (e.g., site A and site B in FIG. 1) has one or more I/O processors or Control Nodes 35 located between host computer systems 40 and storage subsystems 50. Each Control Node is able to export a virtualized disk image to one or more hosts 40. Data exported as virtual disks is physically stored on the back-end storage systems 50. In one embodiment, multiple Control Nodes 35 are clustered thereby providing increased performance, pooled cache, the ability to replicate Dirty Data between Control Nodes, and the ability to fail individual Control Nodes without failing overall operation. The cluster of Control Nodes are interconnected with a network 55. The interconnection network 55 may be the same network as the network for connecting to client hosts (e.g., front end SAN and optional switch(es)), to backend storage subsystems (e.g., backend SAN and optional switch(es)) or the inter-site network (described below), or may be an independent network. Examples of appropriate interconnection networks include InfiniBand, Ethernet, Fibrechannel, other local area networks, and bus protocols such as PCI.

Figure 3:
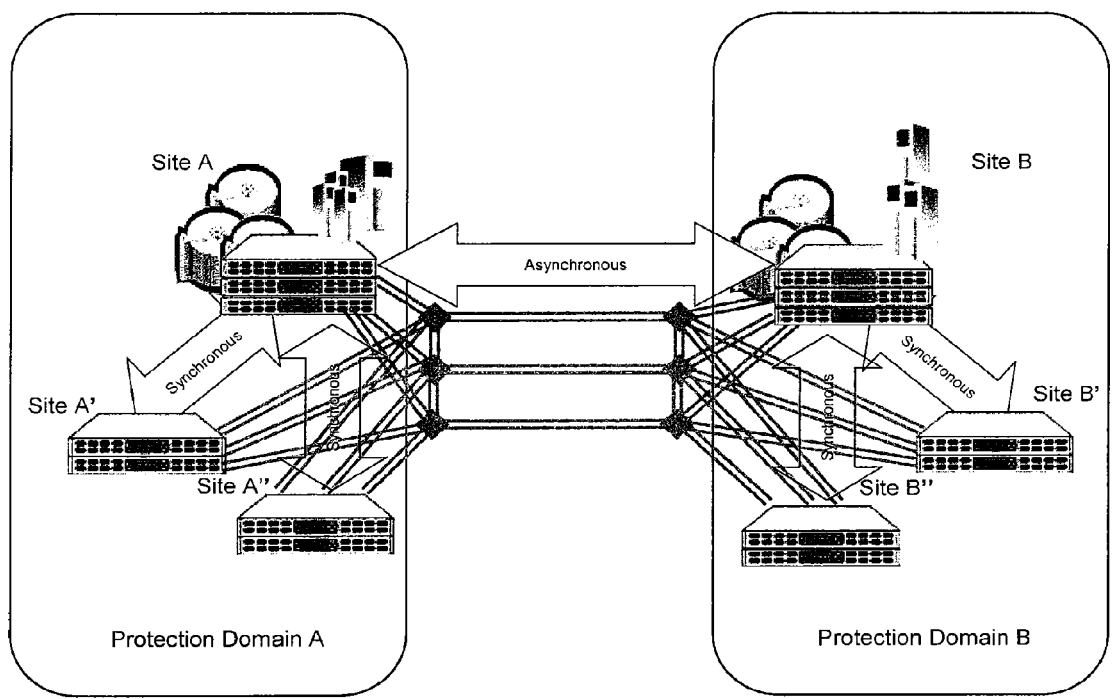
FIG. 3 illustrates how, with a slight variation of the configuration in FIG. 1, additional site failure protection can be achieved according to one embodiment. This Figure shows two Protection Domains each with one Active Site and two Protection Sites.
Figure 4:
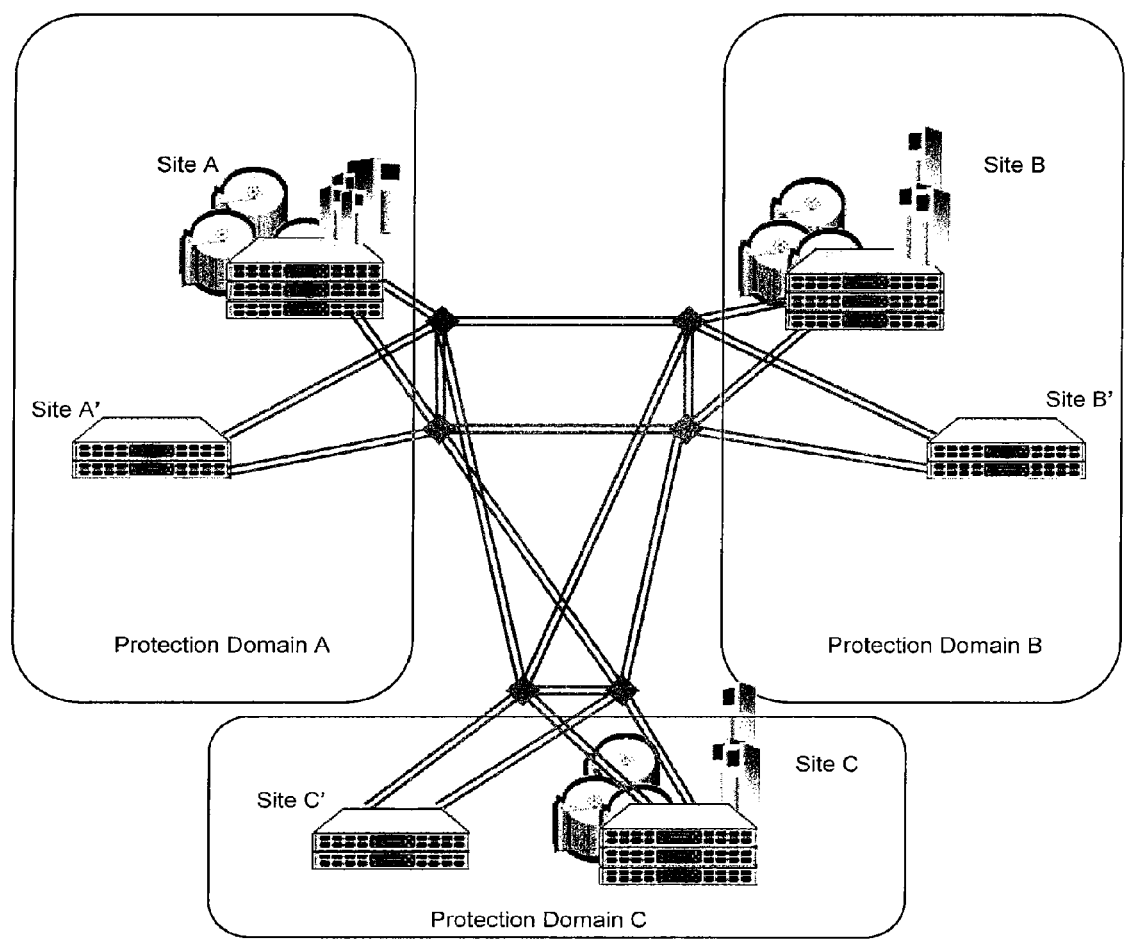
FIG. 4 illustrates a three Protection Domain system according to one embodiment.

In one embodiment, each Active Site 25 has one or more Protection Sites 30 associated therewith. For example, FIG. 1 shows two Active Sites (A and B), each associated with one Protection Site (A' and B', respectively), and FIG. 3 shows two Active Sites (A and B), each associated with two Protection Sites (A', A'' and B', B'', respectively). In one embodiment, each Protection Site 30 contains one or more additional Control Nodes 35. In certain aspects, all Control Nodes 35 at an Active Site are interconnected with all Control Nodes at an associated Protection Site(s), although fewer than all Control Nodes may be interconnected. The physical placement of a Protection Site relative to the location of an associated Active Site is critical in determining the tradeoff between additional data safety by decreasing the likelihood that a disaster may destroy data at both the Active and Protection Sites verses the effect of additional latency induced by increased geographic separation, which may limit the scope of applications suitable for the configuration. For example, distances below 100 kilometers are generally acceptable for even heavy transaction-orientated workloads while distances beyond 80 kilometers are generally considered acceptable in protecting against municipal level disasters. The grouping or association of an Active Site 25 with one or more respective Protection Sites 30 is referred to as a Protection Domain 20. There may be one, two, or more Protection Domains 20 in a complete System. For example, FIG. 3 shows a system with two Protection Domains 20, whereas FIG. 4 shows a system with three Protection Domains 20. One skilled in the art will understand how to create other such variants.

Figure 6:
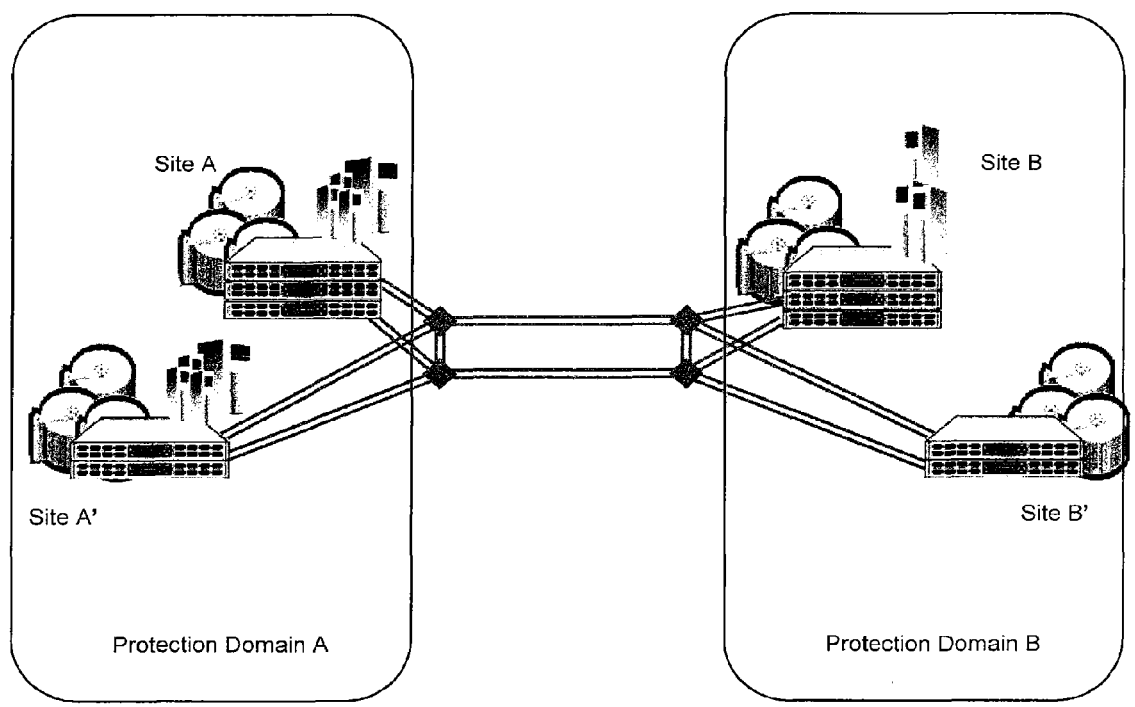
FIG. 6 illustrates a two Protection Domain system with Hosts at both sites within Protection Domain A; each of these two Active sites provides a Protection Site Target for the other.

In alternate embodiments, hosts writing data may be present at multiple sites within a Protection Domain. One example is shown in FIG. 6. In such cases, a given site can serve as both the Active Site for the data writes originating from that site (e.g., from Hosts at that site) and as a Protection Site for other sites having hosts issuing write operations. For example, in FIG. 6, Site A is an Active Site for writes originating from hosts in Site A, and Site A is a Protection Site for writes originating from hosts at Site A', whereas Site A' is an Active Site for writes originating from hosts in Site A', and Site A' is a Protection Site for writes originating from hosts at Site A. It is not necessary that all Active Sites within a Protection Domain house Storage Systems.

Figure 5:
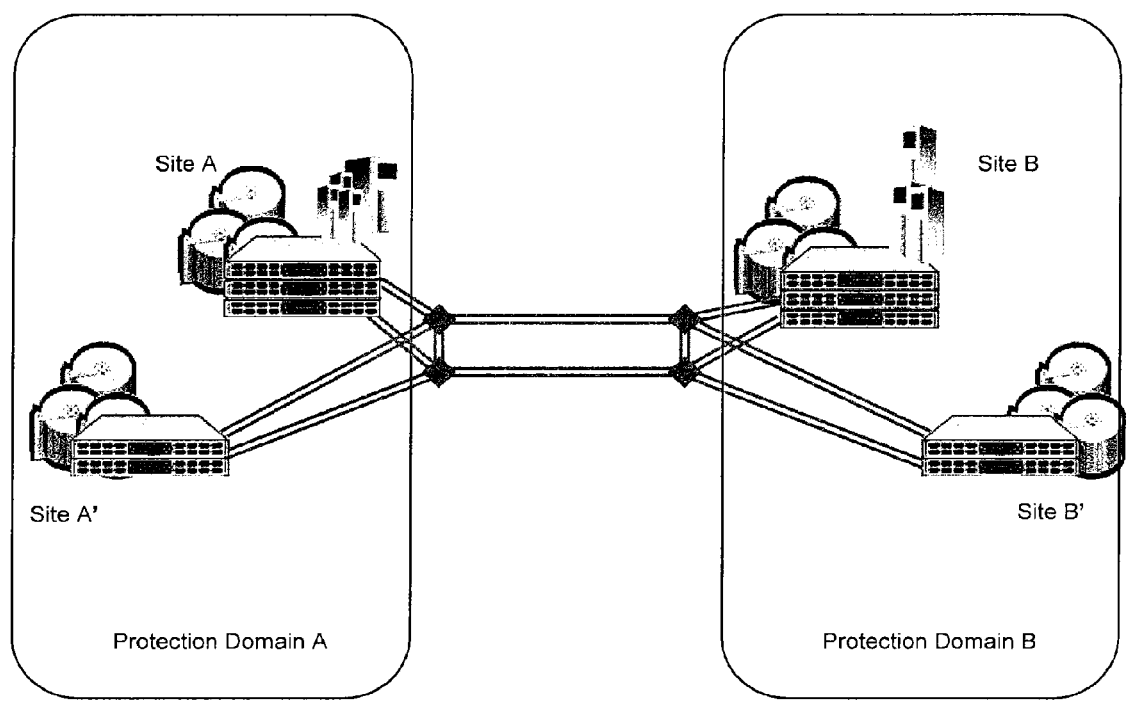
FIG. 5 illustrates placing storage systems at additional sites within a Protection Domain.

In alternate embodiments, storage resources are placed at multiple sites. Examples of such embodiments are shown in FIGS. 5 and 6. This can be done to support legs of Distributed Mirrors across multiple sites within a Protection Domain as well as across Protection Domains and/or to allow access to data from different virtual disks at different sites within a Protection Domain. Any given virtual disk maintained within the overall system may be made available to hosts at any Active Site, but not necessarily all Active Sites. The physical data image for any given virtual disk maintained within the overall system may be maintained at only one Site with cached access to other Active Sites, or may be mirrored at any number of Sites.

System Layering

Figure 7:
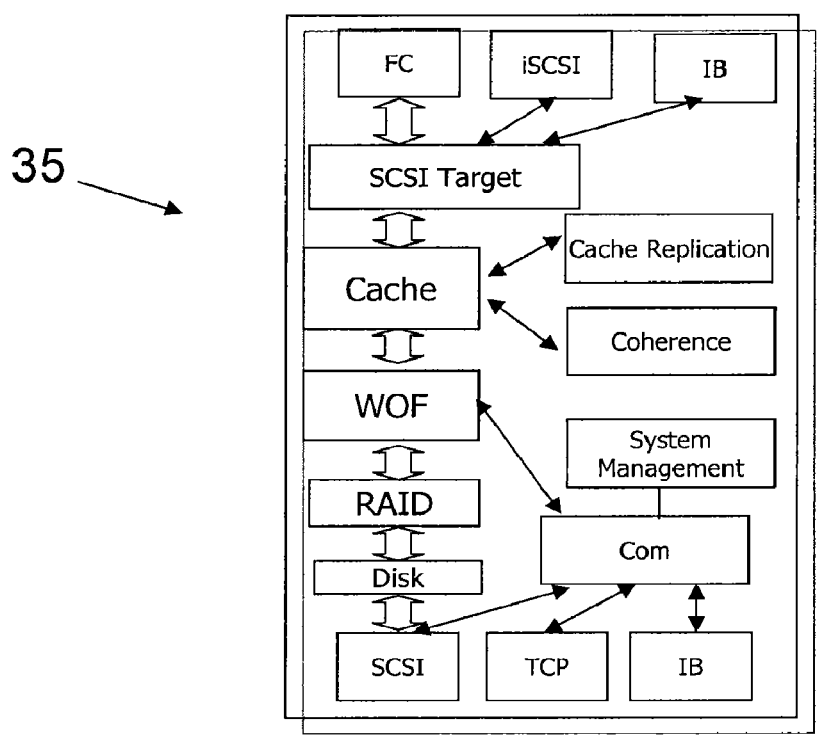
FIG. 7 illustrates the logical layering of functionality within a Control Node.

In one embodiment the functionality within a Control Node 35 is layered with various substantive components as shown in FIG. 7. Within a Control Node 35, such layering provides a logical delineation of various functions. Across the entire system, such layering provides layers of data treatment, including, for example:

1. Across all systems, despite the latency induced by network distance, the coherence layer provides a synchronous image of a virtual disk exported to one or more Hosts located at one or more Sites.
2. The protection layer ensures, synchronously, that data is protected from Control Node or Active Site failures.
3. The coherence layer allows, despite the synchronous presentation of a virtual disk, for the actual data transfer across Protection Domains to be asynchronous. This data transfer is handled by the WOF layer ensuring a time consistent data image is available even in the event of the complete failure of a Protection Domain.
4. The RAID and disk management layers allow for the adaptation of traditional RAID and disk management technology while benefiting from the features and advantages provided herein.

The Front-end (Host facing) Communication protocols shown in FIG. 7, specifically Fibre Channel, IP (and encapsulating protocols such as iSCSI) and Infiniband, are shown as examples. One skilled in the art will readily understand how to apply other communication protocols. Additionally, one skilled in the art would understand how to embed and incorporate distributed file systems, web servers, streaming servers, data base servers, and other applications to allow for higher level protocols (e.g., NFS, RTS, HTTP, etc.) to also be exported to the host.

In one embodiment a cache is maintained. The cache is used for both supporting write-back operations, e.g., acknowledging the write operation before Dirty Data is safely on disk, as well as traditional caching to support accelerated read operations. One skilled in the art will also know how to incorporate other traditional functions such as pre-fetch, scatter/gather I/O operation optimization, and cache retention algorithms.

Caches exporting any given virtual volume are coherent. A write to any block of any given virtual volume will cause previous images of those blocks stored in the caches of any Control Node sharing access to copies of those blocks to be "invalidated". To ensure that network latency does not hamper the performance of cache coherence, coherency should be implemented as a peer-based model as opposed to traditional approaches of maintaining a master directory accessed by clients. Lock management should migrate to the Control Node generating the I/O operations to ensure most management functions are performed locally. Distributed cache coherence and lock management techniques are described in Ser. No. 11/177924, filed Jul. 7, 2005, titled "Systems and Methods for Providing Distributed Cache Coherence" and U.S. Pat. No. 6,148,414 and U.S. patent application Ser. No. 10/00,6929, filed Dec. 6, 2001, both titled "Methods and Systems for Implementing Shared Disk Array Management Functions," the disclosures of which are each incorporated by reference herein.

A Protection layer (e.g., cache replication and coherence) replicates copies of Dirty Blocks between both local Control Nodes and to Control Nodes located on Protection Sites. The protection of data blocks is completed before the write operation is acknowledged to the originating host. The Protection layer is also responsible for deleting any protection copies once the blocks are safely on the physical storage systems. The Protection Layer is also responsible for locating and deploying appropriate protection copies should a Control Node fail and thus lose the original copy of the blocks.

A WOF layer provides mechanisms to minimize the risk that data is lost due to the loss of untransmitted Dirty Data held within the cache of failed nodes. The term WOF as used herein refers to a group of related properties, each of which describes the contents of a storage system after recovery from some type of failure, i.e., after the storage system recovers from a failure, properties that the application can assume about the contents of the storage system. WOF introduces a guarantee that, after recovery from a failure, surviving data will be consistent. Complex applications such as file systems or databases rely on this consistency property to recover after a failure of the storage system. Even simpler applications that are not explicitly written to recover from their own failure or the failure of backend storage should benefit from these post-failure guarantees.

RAID and disk management layers manage volumes presented by the underlying storage systems. In one embodiment, the RAID level includes volume concatination, volume partitioning, RAID 0 striping, RAID 1 local mirroring, and other traditional volume management functions. One skilled in the art will also understand how to embed higher level volume functionality, examples of which include volume snapshots, compression, Continious Data Protection (CDP) images, encryption, on-demand storage allocation as taught by U.S. Pat. No. 6,857,059, titled "Storage Virtualization System and Methods," the contents of which are incorporated by reference herein.

A system management layer provides internode monitoring, drives recovery operations, provides operator command interfaces, alert notification and other system management functionality. Other embodiments may include other system management functionality.

In other embodiments some of the above functionality may be moved into other subsystems.

The Chronology of a Write Operation

Figure 8:
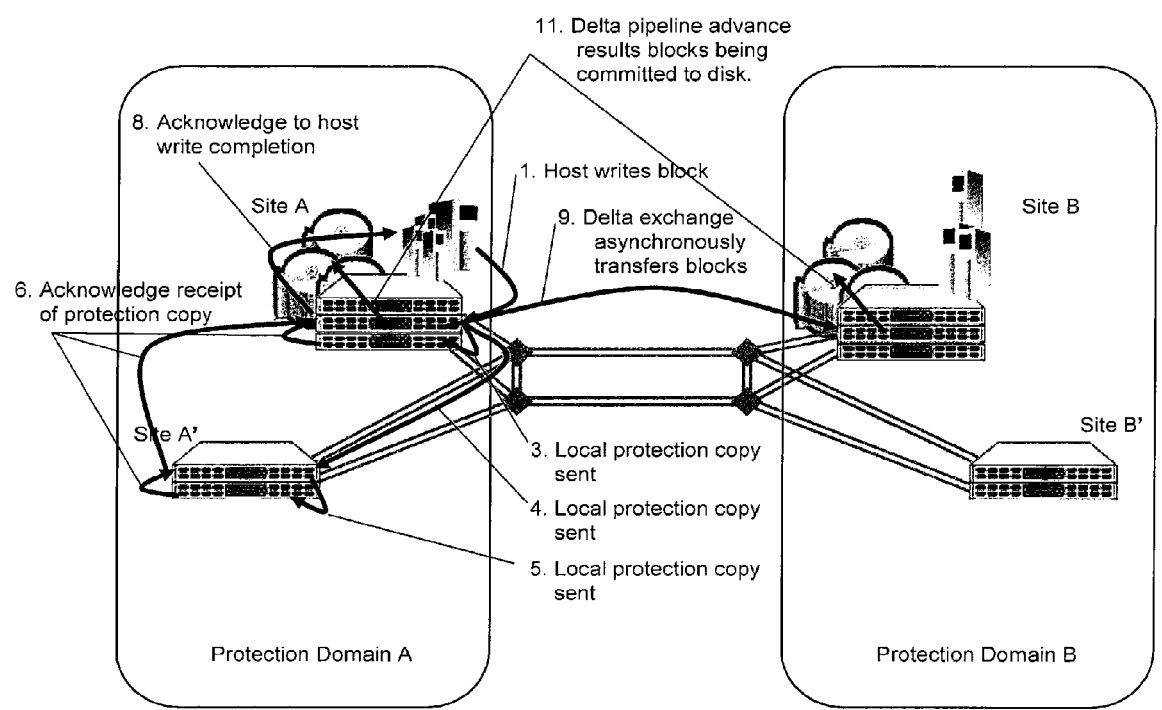
FIG. 8 illustrates the chronology of data transfer during a write operation.

To better understand how data is protected according to various embodiments, it is useful to follow the steps induced by a write operation from a Host as shown in FIG. 8 according to one embodiment. In step 1, the Host, H, at Site A issues a write operation request to one of the Control Nodes within Site A, referred to herein as the Write Target Node for a given write operation, W. The write operation is modifying a portion of a virtual volume, referred to as the Data Range, which spans one or more blocks of storage in the virtual volume and, ultimately, the physical storage system(s). If it does not already have one, the Write Target Node secures a lock on all data blocks within the Data Range. In optional step 3, the Write Target Node sends a protection copy of the Data Range to another Control Node within its site (Site A). In step 4, concurrently with step 3 above, the Write Target Node sends a protection copy of the Data Range to a first Control Node at each of the Protection Sites within its Protection Domain. In step 5, the first Control Node in each Protection Site sends the image to one or more other Control Nodes within that Protection site and awaits acknowledgements that it has been delivered. In step 6, the Write Target Node receives acknowledgment from each first Control Node to which it sent a protection copy that all Protection Nodes have received a copy of the Data Range. The Write Target Control Node checks to see if any other Control Node has an earlier image of any data blocks within the Data Range within its cache. If it does, it invalidates those earlier images. This is the cache coherence mechanism described above. The Data Range is placed into the Open Delta Region. At this point, the copies of the Data Range exist at all sites within the Protection Domain of the Active Site where W originated. In step 8, the Write is now acknowledged to the Host as complete. After acknowledgement, in step 9, the Delta Pipeline advances, as taught in more detail in application Ser. No. 11/486,754 which is incorporated in its entirety, causing the Data Range to be distributed (asynchronously) to sites in other associated Protection Domains maintaining physical copies of the virtual volume. In step 11, the Delta Pipeline again advances causing the Data Range to be written to physical storage at all sites maintaining physical copies of the virtual volume. Thereafter, all protection copies of the Data Range are deleted (storage is freed). The original copy in the Write Target Node or other protection copies may be left in cache depending on how the caching system is managed.

The above sequence ensures that once the write operation is acknowledged as complete to the Host, any Dirty Data Blocks (e.g., blocks which have not yet been safely stored at all disk array mirrors) are kept in the cache of Control Nodes of at least two sites and, optionally, at more than one Control Node within a site. While all Protection Domains do not necessarily need to house a mirror of the physical image, physical mirrors should be placed on storage arrays located in at least two sites in two separate Protection Domains. Networking between all sites should be dual redundant. In the above manner, no data will be lost if any single piece of equipment fails or if any single site fails.

Physical configurations such as in FIG. 3 can be deployed where dirty data is protected at two Protection Sites. If physical mirrors are kept at, as a minimum, three sites, then the system can survive any double failure, including the complete loss of two sites, without data loss or interruption in overall system availability.

Failure of a Control Node

Should a Control Node fail somewhere within the overall system the following procedure is performed according to one embodiment. The failure of a Control Node(s) is detected by either the loss of a inter-node heart beat or by an inter-node error alert from the failing Control Node or by non-recoverable I/O errors when communicating with the Control Node. Upon detection of a node failure, the system will suspend I/O and determine which nodes are surviving through inter-node messaging. Any node determined to be, or believed to be, dead will be fenced, e.g., using a STONITH technique, to ensure that the node is dead. New roots are chosen for any data structures that may have been rooted at the failed nodes. The system will inventory any primary data blocks that may have been housed on the failed Control Node(s), choose a protection copy, and upgrade the protection copy to be a primary copy. Optionally, the system may move the addresses of virtual disks being served by the failed Control Nodes to alternate nodes. Alternatively, fail-over device drivers or alternate I/O paths from Hosts to alternate Control Nodes can provide the same recovery functionality. Thereafter, operations continue as normal, except with a reduced node count.

Failure of a Physical Storage System

With reference to FIG. 2, should a storage system 50 attached to the backend of a Control Node 35 fail or the I/O path attached to the backend of a Control Node 35 fail, the following procedure is performed according to one embodiment. The failure is detected by timeouts in commands issued to the storage system 50 or by error messages reported by the storage system 50, and the Control Node that detects the failure marks the storage system offline in a global data structure. Control Nodes initiating writes to storage systems housing alternate legs of mirrors begin a Change Log of which blocks have been modified. Should the failed storage system 50 subsequently return to operational status, the system determines through the Change Logs maintained at various Control Nodes writing to alternate legs of the mirrors maintained on the storage array which blocks have changed, and those systems send those updated blocks to a Control Node to which the returning array is attached, which in turn writes those changes to the storage array. Thereafter, I/O operations continue per normal.

In an alternate embodiment, I/O operations to the returning storage system may be restarted earlier by determining which blocks housed on the storage system are up-to-date (via Change Logs) and allowing I/O operations directly to those blocks. Read operations for blocks not up-to-date are directed to alternate legs of mirrors.

Failure of a Site

Should an Active Site 25 fail, or connectivity to that site fail, the following procedure is performed according to one embodiment. The failure of a Site is detected by either the loss of a inter-node heart beat or by non-recoverable I/O errors when communicating with the Control Nodes located at the site. When a failure is detected, I/O is suspended on all Control Nodes at all Sites, and an inter-site connectivity graph is created to detect partial connectivity (i.e., where some sites can communicate with a given site but others cannot). Partial connectivity to a site is treated as a complete site failure. Such sites are isolated by marking these sites as offline and ignoring subsequent communications other than communications relating to their restart sequence. The system then performs the discovery and structure procedure as for failures of one or more Control Nodes described above, and the system resumes operation. If the failing site housed a storage array, then the Change Logging procedures described in the Storage Array Failure section above is used.

If a site failure results in an Active Site losing of one or more if its Protection Sites, then the system has reduced resiliency with respect to future additional failures. When in a state of reduced resiliency, system administrators must make a choice between different courses of action, for example:

1. Continuing to operate with reduced resiliency.
2. Failing the active site.
3. Going into write-through mode to the asynchronous sites.
4. Continuing to operate with reduced resiliency while migrating applications off the site.

Option 3 may be equivalent to option 2 as the increased latency induced by synchronously pushing all transactions through to distant Protection Domains will cause many applications to fail. Optionally, the system can provide mechanisms to automatically set the correct course of action on a virtual volume by virtual volume basis.

Failure of a Protection Domain

The failure of an entire Protection Domain may result in lost data due to the loss of untransmitted blocks (Dirty Data) held within the cache of the failed nodes. Methods for implementing Write Order Fidelity (WOF) taught in U.S. patent application Ser. No. 11/486,754, filed Jul. 14, 2006, which is incorporated by reference herein, provide several mechanisms to minimize this risk. One such mechanism detects periods during which an Active Site, while capable of writing data to a virtual volume, does not have any Dirty Data for that volume. In such cases no data is lost, therefore, operations can continue at surviving sites without operational interruption.

Should the system determine, after the failure of an entire Protection Domain, that there has been data loss for any given virtual volume, the System must suspend I/O to that volume, and back up the WOF state such at an earlier version of the virtual volume is exported. The Hosts accessing the virtual volume, their file systems, and their applications must be restarted to ensure data cached within those subsystems does not corrupt what is otherwise a time consistent data image. Without restart, these applications are at risk of failure because their cached state is now inconsistent with the new state of the virtual volume.

The use of WOF is considered optional as many operations will consider the protection provided by cache protection within Protection Domains adequate or the specific application is such that continuing operations with an inconsistent data image is non-fatal.

Detailed Failure Analysis Examples

Tables 1 and 2 of FIGS. 9-13 illustrate examples of detailed operational steps in write and read operations, respectively, with various failure scenarios inserted throughout the steps. There is one scenario for a Write operation (Table 1) and four scenarios for a Read operation (Tables 2a, 2b, 2c, and 2d). All analysis applies to the example configuration shown in FIG. 8, except in this example, only a single protection copy is kept in the Protection Site, rather than the three protection copies shown in FIG. 8 (original copy, first protection copy in second Control Node at site A, second and third protection copies in each of two nodes at site A'). In each Table, the right four columns represent the actions at each of the four sites. Actual cities are listed to as an example of geographic separation between sites. The leftmost column enumerates the steps of the read or writes in normal operation. Thus, the four right cells for a step show the actions of each of the sites for that step.

Inserted between the normal-operation steps are the various failure scenarios that could occur at this point in time. Each such failure scenario is labeled with a failure number (beginning with "F") in the second column which may be referenced in other failure scenarios with similar response sequences. The balance of the row starting a failure scenario is a brief description and, in the column for a particular site, the condition(s) potentially causing failure. The rows subsequent detail the steps and operations at each of the sites in detecting and recovering from the specific failure.

As used in the Tables, "Rediscovery" generally refers to the process of, after the detection of a failed Control Node, determining the surviving nodes, re-establishing data structures, and recommencing operations. "Commit" refers to an acknowledgement to a host that a write operation is complete.

While these tables show, for this example embodiment, only operations directed at a control node at Site A, one skilled in the art will understand that the same sequence would apply to write operations directed at any control node at Site A or any control node at Site B.

Conclusion

Accordingly, embodiments advantageously provide a data system that allows computers reading data from and writing data to a plurality of data centers separated by, potentially, large distances to:

a) Maintain a single image of data accessible for both read and write operations at these multiple sites.

b) Provide data caches that accelerate access to data that is coherent across all sites and access points.

c) Protect data written at any sites such that any single failure, including a municipal level disaster that destroys a data center, will neither result in any data loss nor interrupt data availability at the surviving sites.

d) Provide asynchronous transfer of data between highly separated sites to ensure no loss of performance due to network latency.

e) Optionally, deliver data in Write Order Fidelity (WOF) so that a double failure, including the failure of two synchronous municipalities, will still provide a time consistent image of the data allowing for a restart of the operation.

f) Optimize network usage by minimizing redundant data transfer, by optimizing network transfer packet sizes, and by minimizing communication synchronization.

While the invention has been described by way of example and in terms of the specific embodiments, it is to be understood that the invention is not limited to the disclosed embodiments. To the contrary, it is intended to cover various modifications and similar arrangements as would be apparent to those skilled in the art. For example, while the embodiments described in this patent are implemented at the SCSI block layer, one skilled in the art would understand that the same concepts could be implemented at other layers including, but not limited to, the application layer, the file system layer, the operating system layer, or the storage system layer. Additionally, the methods taught herein are not specific to SCSI or any other protocol or collection of protocols. Indeed additional protocols might include FCon, ATA, SATA, and other protocols implemented over any network protocol such as Fibre Channel, Infiniband, Ethernet, and various bus protocols such as PCI. Therefore, the scope of the appended claims should be accorded the broadest interpretation so as to encompass all such modifications and similar arrangements.

What is claimed is:

1. A method of providing data availability and fault tolerance in a data storage network having a first protection domain comprising a first site and a second site, and a second protection domain separate from the first protection domain, the second protection domain having a third site, each site including at least one control node, the method comprising the steps of:

storing a write request received from a host system to a first cache, the first cache corresponding to a first node in the first site;

transmitting the write request to a second node at the second site;

storing the write request received from the first node to a second cache in the second node, the write request in each of the first and second caches being directed to a first leg of a multiple-leg mirror volume distributed across the first and second protection domains, the write request in the second cache being a protection write request for temporary storage until the write request from the host is safely stored on at least two legs of the multiple-leg mirror volume;

receiving at the first node an acknowledgement from the second node that the write request was received by the second node and stored in the second cache without also being written by the second node to a physical storage device;

in response to receiving the acknowledgment from the second node, acknowledging to the host system by the first node that the write request is complete;

sending the write request to a third node at a third site within the second protection domain, the write request to the third node being directed to a second leg of the multiple-leg mirror volume; and upon the write request to the third node being stored on a physical storage device in the second protection domain, deleting the protection write request in the second cache without storing the protection write request on a physical storage device in the first protection domain.

2. The method of claim 1, further comprising:

sending the write request to another node in the first site simultaneously with transmitting the write request to the second node in the second site; and storing the write request received from the first node to a cache in said another node; and acknowledging receipt of the write request by said another node to the first node.

3. The method of claim 1, further comprising:

sending the write request from the second node to another node in the second site;

storing the write request received from the second node to a cache in said another node; and acknowledging receipt of the write request by said another node to the second node.

4. The method of claim 1, wherein the first site is located within about 80 kilometers of the second site.

5. The method of claim 1, wherein sites within the first protection domain are located greater than about 80 kilometers from sites within the second protection domain.

6. The method of claim 1, wherein the nodes in the first site are interconnected with the nodes of the second site over a WAN interconnect.

7. The method of claim 1, wherein the nodes in the first site are interconnected over one of a LAN interconnect, a MAN interconnect, a bus, an Fibre channel interconnect a SCSI interconnect, and an Infiniband interconnect.

8. The method of claim 1, further comprising:
determining by the first node whether any other nodes have data in cache corresponding to a data range associated with the write request; and
if so, sending a cache invalidate message to said any other nodes identifying the data range.

9. The method of claim 1, further comprising:
writing data identified in the write request to physical storage.

10. The method of claim 9, wherein writing is performed by all nodes maintaining physical copies of a data range identified by the write request.

11. A data storage network that provides high data availability and fault tolerance, the network comprising:
a first protection domain including a first site having a first control node and a second site having a second control node, wherein the first and second control nodes each have a cache; and
a second protection domain having third site having a third control node, the third control node having a cache;
wherein the first control node is configured to:
i) store a write request received from a host within the first site to its cache;
ii) send the write request to the second node for storing in its cache, the write request in each of the first and second caches being directed to a first leg of a multiple-leg mirror volume distributed across the first and second protection domains, the write request in the second cache being a protection write request for temporary storage until the write request from the host is safely stored on at least two legs of the multiple-leg mirror volume; and
iii) upon receiving an acknowledgement from the second node that the write request is stored in its cache, the acknowledgment being sent upon the write request being stored in the second cache without also being written by the second node to a physical storage device:
a) acknowledge to the host that the write request is complete;
b) send the write request to the third control node, the write request to the third control node being directed to a second leg of the multiple-leg mirror volume; and
c) upon the write request to the third control node being stored on a physical storage device in the second protection domain, delete the protection write request in the second cache without storing the protection write request on a physical storage device in the first protection domain.

12. The data storage network of claim 11, wherein the first control node is further configured to:
iv) determine whether any other control nodes have data in cache corresponding to a data range associated with the write request and, if so, send a cache invalidate message to said any other control nodes.

13. The data storage network of claim 11, wherein the first control node is further configured to:
iv) send the write request to another control node in the first site simultaneously with sending the write request to the second node in the second site.

14. The data storage network of claim 11, wherein the first protection domain is located greater than about 80 kilometers from the second protection domain.

15. The data storage network of claim 11, wherein the first site is located within about 80 kilometers of the second site.

16. The data storage network of claim 11, wherein the first site includes one or more physical storage resources, and wherein the first control node is further configured to: iv) access and/or modify data identified in the write request.

17. A data storage network control node for use as a first control node in a data storage network, comprising:
a cache; and
a processor that implements logic that is configured to:
i) store a write request received from a host system in the cache, the host system and first control node being in a first site;
ii) send the write request to a second control node in a second site, said first and second sites being part of a first protection domain, the write request being sent for storing in a cache of the second control node, the write request in the caches of the first and second control nodes being directed to a first leg of a multiple-leg mirror volume distributed across the first protection domain and a second protection domain separate from the first protection domain, the write request in the cache of the second control node being a protection write request for temporary storage until the write request from the host is safely stored on at least two legs of the multiple-leg mirror volume; and
iii) upon receiving an acknowledgement from the second control node that the write request is stored in its cache, the acknowledgment being sent upon the write request being stored in the second cache without also being written by the second node to a physical storage device:
a) acknowledge to the host system that the write request is complete;
b) send the write request to a third control node in the second protection domain, the write request to the third control node being directed to a second leg of the multiple-leg mirror volume; and
c) upon the write request to the third control node being stored on a physical storage device in the second protection domain, delete the protection write request in the second cache without storing the protection write request on a physical storage device in the first protection domain.

18. The data storage network control node of claim 17, wherein the logic is further configured to:
iv) determine whether any other control nodes have data in cache corresponding to a data range associated with the write request and, if so, send a cache invalidate message to said any other control nodes.

19. The data storage network control node of claim 17, wherein the logic is further configured to:
iv) send the write request to another control node in the first site simultaneously with sending the write request to the second node in the second site.

20. The data storage network control node of claim 17, wherein the first protection domain is located greater than about 80 kilometers from the second protection domain.

21. The data storage network control node of claim 17, wherein the first site is located within about 80 kilometers of the second site.

22. The data storage network control node of claim 17, wherein the first site includes one or more physical storage resources, and wherein the logic is further configured to:
iv) access and/or modify data identified in the write request.

23. The network of claim 11, wherein if the first site and/or the first control node fails, a data range identified by the write request is accessible to host systems via one or more of the second control node or another control node in the second site or a control node in the third site in the second protection domain, said third site including the third control node.

24. The network of claim 11, wherein if the first site and/or physical storage in the first site fails, a data range identified by the write request is recoverable using change logs maintained by one or more of the second control node, another control node in the second site or a control node in the third site in the second protection domain, said third site including the third control node.

25. The network of claim 11, if the first site and/or the first control node fails, the second control node or another control node in the second site is available to the host and other host systems to process write requests for at least the data range identified by the write request.

26. The data storage network control node of claim 17, wherein functions of the logic are performed in a normal operating mode in which none of the nodes, sites and protection domains have failed, and wherein the logic is further configured to:
 1) upon failure of one of the nodes, (a) initially suspend input/output operations at all nodes in the same site as the failed node, (b) prevent the node from receiving future write requests, (c) identify protection copies, stored on other nodes, of primary data blocks stored on the failed node, and upgrading the protection copies to become primary copies, and (d) thereafter resume input/output operations without participation of the failed node;
 (2) upon failure of one of the sites, (a) initially suspend input/output operations at all sites, (b) prevent the failed site from receiving future write requests, (c) identify protection copies, stored in other sites, of primary data blocks stored at the failed site, and upgrade the protection copies to become primary copies, and (d) thereafter resume input/output operations without participation of the failed site; and
 (3) upon failure of one of the protection domains, (a) initially suspend input/output operations to all volumes for which there may be data lost due to failure of the protection domain, (b) back up a write-order-fidelity state of the volumes to earlier versions prior to the writing of the lost data, and (c) resume input/output operations to the volumes and restarting any applications using the volumes.

27. The data storage network control node of claim 26, wherein the failed site is a protection site for an active site, and wherein the logic is further configured to select from among a set of options for the continued operation, the set of options including operating indefinitely with reduced resiliency; failing the active site; entering a write-through operating mode with respect to write requests sent to the second protection domain; and operating with reduced resiliency only while migrating applications off the active site.

* * * * *